UNITED STATES PATENT OFFICE.

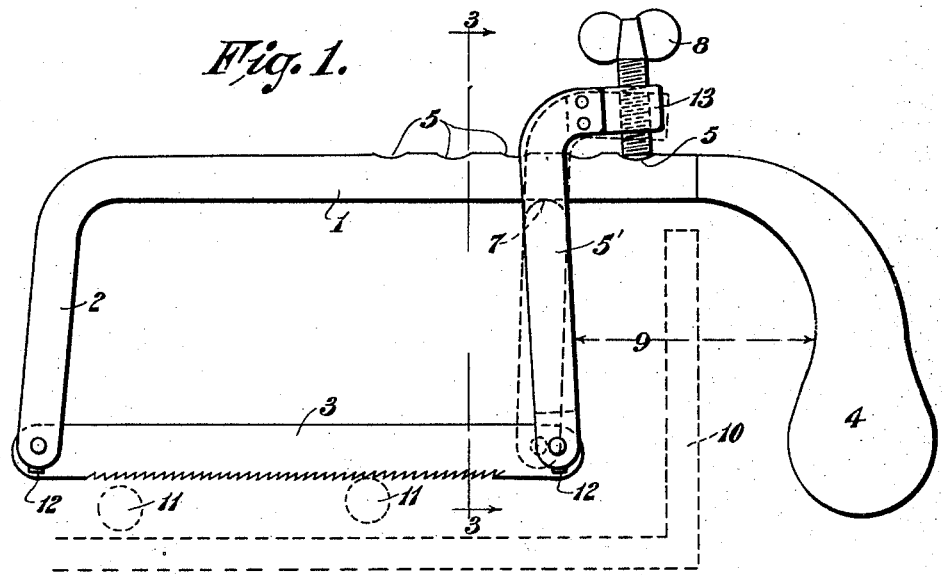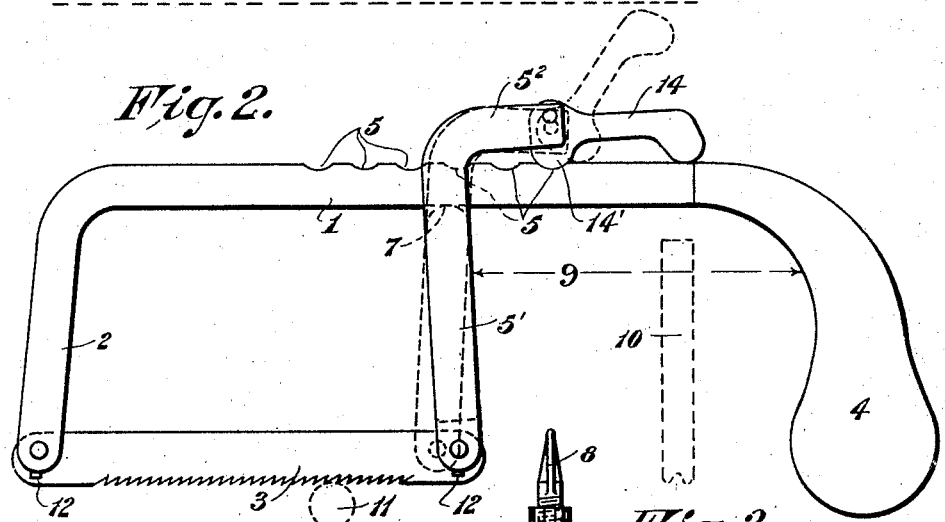

GEORGE H. WILKINS, OF GREENFIELD, MASSACHUSETTS.

HACKSAW-FRAME.

1,382,448.     Specification of Letters Patent.     Patented June 21, 1921.

Application filed October 23, 1920. Serial No. 418,880.

*To all whom it may concern:*

Be it known that I, GEORGE H. WILKINS, a citizen of the United States of America, residing at Greenfield, county of Franklin, Commonwealth of Massachusetts, have invented certain new and useful Improvements in Hacksaw-Frames, of which the following is a specification.

This invention relates to improvements in the construction of hack saw frames.

An object of the invention is to provide a frame which will permit or enable the operator to reach inaccessible places where it is often necessary to remove or cut off an obstruction, as for example, a nail or other metal object, which could not be reached at all with the ordinary hack saw frame construction. This is accomplished by employing a relatively short blade so as to provide a working space between the handle, or grip portion of the frame, and the inner end of the saw blade, whereby the operator is enabled to not only reach the obstruction, but to readily and easily operate or reciprocate the frame.

A further object is to provide means for quickly and effectively tightening or placing the requisite tension on the saw blade, and to so locate the same that it will be out of the path or travel of the blade when the frame is operated.

A further object is to provide means for accommodating saw blades of different lengths.

Further objects of the invention and their nature will appear in the body of the specification and will be particularly pointed out in the claims.

Referring to the drawings:

Figure 1 is a side elevational view showing the complete structure and indicating how the saw frame is used; also the locking and tensioning device for the blade.

Fig. 2 is a side elevational view of a modification of the locking and tensioning device.

Fig. 3 is a sectional elevational view on the line 3—3 of Fig. 1 showing the manner of mounting the adjustable locking and tensioning arm.

Fig. 4 is a top plan view of the locking device shown in Fig. 1.

Referring to the drawings in detail: 1 designates the back or bar member of the hack saw which is formed with an integral bent portion 2 to which one end of the saw blade 3 is connected. At the other end of the bar 1 the handle or grip member 4 is attached in any suitable manner. The upper edge of the bar is formed with a plurality of spaced notches or recesses 5. These notches are for the purpose of permitting the blade tensioning and locking device to be adjusted along the bar and for accommodating blades of different lengths. This tension and locking device comprises a downwardly extending member 5', to the lower end of which the end of the blade 3 is secured. This member is formed with an opening 6' to receive the bar 1, the lower part of which opening is made with a curved surface 7 for the purpose of furnishing a fulcrum point about which this member turns when the thumb nut 8 which is located in its opposite bent end portion, is tightened.

The adjustable member 5' serves to provide an operating space 9, whereby an obstruction 10 may be spanned by means of this space between the handle 4 and member 5'. This space permits the operator to reach a nail or other object indicated at 11 and which it is desired to remove. The occasion to reach and remove a nail, for example, often arises in placing electric wires in a building or in plumbing operations. 12 designates projections on the members 2 and 5 for attaching the saw blade so that it may stand in a horizontal plane, if desired.

The operation of the blade tensioning and locking device may be described as follows: The adjustable member 5' is moved along the bar 1 the required distance to receive the blade 3. The thumb screw 8 is now turned downward into one of the recesses 5. This operation causes the member 5' to rock or move from the dotted to the full line position. The curved surface 7 will engage and turn on the lower edge of the bar 1. The thumb nut passes through a threaded nut 13 in the upper outer end of the member 5'. It will be seen, therefore, that by providing the space 9, an obstruction 10 may be readily spanned and the nail 11 reached by the blade 3 and quickly removed.

Referring to Fig. 2 which shows a slight modification of the locking device. The adjustable member 5' is formed with a bent upper portion $5^2$ to which is pivotally attached the eccentric thumb lock 14, the nose portion 14' of which is designed to engage and enter one of the recesses 5. When the lock is raised to its dotted position, the arm 5' may be moved along to the bar 1. After the blade 3 is attached, the lock is moved down into its full line position. This operation causes the arm 5' to assume the full line position and its curved edge 7 to engage and turn on the lower edge of the bar 1, as already described.

It should be particularly observed that the tensioning and locking device is located entirely above the bar 1, and that there is no obstruction of any kind at the lower ends of the members 2 and 5' where the saw blade 3 is attached. In other words, the above described device is located out of the path or travel of the blade, thus permitting the bar and blade to pass, if necessary, through narrow openings. It is, of course, obvious that full length blades may be used, as desired.

It will therefore be observed that I have produced a reliable and cheaply constructed hack saw frame and one that will permit its use in places which ordinarily are inaccessible.

What I claim is:

1. A hack saw construction, comprising in combination, a rigid bar member formed with an integral bent part at one end for attaching one end of the saw blade, a handle secured to the opposite end of the bar and extending downwardly therefrom, said bar having spaced notches, a device for attaching the other end of the saw blade to the bar and for placing tension on the same and comprising a member slidable on the bar and having a portion extending above the same, a locking device in said extension for engaging one of the notches and for simultaneously operating said attaching device for tensioning the blade, said device being located out of the path or travel of the blade.

2. A hack saw construction comprising in combination, a bar member one end of which is formed with an arm portion for attaching one end of the saw blade, and the other having a handle secured thereto, said bar having spaced notches in its upper edge for receiving a blade tensioning and locking device to accommodate blades of different lengths, and said device being so constructed and arranged to be out of the path or travel of the blade and to provide a work space between the handle and said tensioning and locking device.

3. A hack saw frame construction, comprising in combination, a bar formed with a plurality of spaced notches in its upper edge and having a blade attaching portion at one end and a handle at its other end, an angular shaped slidable and rockable member on the bar for attaching the other end of the blade, a locking device mounted on the same and designed to engage one of the notches for causing the slidable member to be adjustably secured against movement on the bar and for causing the blade to be placed under tension, said member serving to provide a working space between the same and the handle and out of the path of the blade, whereby an obstruction may be spanned, as described.

4. A hack saw frame construction, having in combination, a bar with an extension portion for attaching one end of a saw blade, an adjustable member on the bar for attaching the other end of the blade, said member having a curved surface to engage the lower side of the bar, a securing and blade tensioning device in the member and located above the bar for engaging the upper edge of the bar for moving the curved surface against the under side of the bar and rocking the member to simultaneously place the desired tension on the blade, said curved surface serving as a pivotal point about which said member rocks when the securing and blade tensioning device is operated, said adjustable member serving to provide an open space between the same and the handle, for the purpose described.

GEORGE H. WILKINS.